May 30, 1933. L. R. BROWN 1,911,796
REGISTER
Filed July 23, 1931 7 Sheets-Sheet 1

Fig. 1.

INVENTOR
Lee R. Brown
BY
Stuart Hilder
ATTORNEY

May 30, 1933.  L. R. BROWN  1,911,796
REGISTER
Filed July 23, 1931  7 Sheets-Sheet 2

INVENTOR
Lee R. Brown
BY
Stuart Hilde
ATTORNEY

May 30, 1933.    L. R. BROWN    1,911,796
REGISTER
Filed July 23, 1931    7 Sheets-Sheet 3

Fig. 3.

INVENTOR
Lee R. Brown
BY
Stuart Hilder
ATTORNEY

May 30, 1933.  L. R. BROWN  1,911,796
REGISTER
Filed July 23, 1931   7 Sheets-Sheet 4

INVENTOR
Lee R. Brown
BY Stuart Hilder
ATTORNEY

May 30, 1933.   L. R. BROWN   1,911,796
REGISTER
Filed July 23, 1931    7 Sheets-Sheet 5

INVENTOR
Lee R. Brown
BY
Stuart Hilder
ATTORNEY

Patented May 30, 1933

1,911,796

UNITED STATES PATENT OFFICE

LEE R. BROWN, OF EAST ORANGE, NEW JERSEY, ASSIGNOR TO MONROE CALCULATING MACHINE COMPANY, OF ORANGE, NEW JERSEY, A CORPORATION OF DELAWARE

REGISTER

Application filed July 23, 1931. Serial No. 552,597.

The invention relates to resetting means for the numeral wheels of registers, and more particularly to resetting means whereby the results of calculations in currency of small denominations, such as French centimes, may be registered in arbitrary figures, showing, for instance, the nearest five centimes, instead of the true total.

Thus, in calculating in centimes, a value less than .025 would be read as .000; a value from .025 to .075 would be read as .050, and a value from .075 to .100 would be read as .100. This object may be attained by adding .025 to a product registered on the numeral wheels, whereby the well known tens transfer mechanism will advance the higher order wheels in accordance with the arbitrary registration, and by providing an arbitrary series of figures on the centimes wheel. When, however, the sum of a series of products is to be registered, upon a grand total register, it may be necessary in registering the undividual products, to reset the centimes and half-centimes wheels of such register to 25 or to 75, according to the subtotal standing therein, involving a resetting of the centimes wheel from 0, 1, 3 or 4 to 2 (each of which figures is actually registered as 0), or from 5, 6, 8 or 9 to 7 (each registered as 5). This is accomplished by the present invention.

By way of illustration, the invention is shown as applied to the resetting means disclosed in application 531,274, filed April 20, 1931, and also to that disclosed in application 544,065, filed June 13, 1931, both entitled Registers, and being inventions of the present applicant.

The invention consists in the novel construction and combination of parts as set forth in the appended claims.

In the principal form of the invention two parallel shafts 17 and 18 are mounted in the shiftable register carriage, these shafts supporting numeral wheels 15 and 16 respectively, each wheel being marked upon its periphery with the digits from 1 to 9 and 0. Selected values are registered in these wheels by the well known actuating means, acting through intermediate gears 19 and the gears 20 secured to the numeral wheels. That is to say amounts set up in the usual keyboard are transferred therefrom simultaneously, by duplicate mechanisms to the registers 15 and 16. The registration is read through openings 21 and 22 in the casings 23 and 24. A third shaft 26 supports the well known revolution counting wheels 25, upon which multipliers and quotients are registered.

Figure 1:
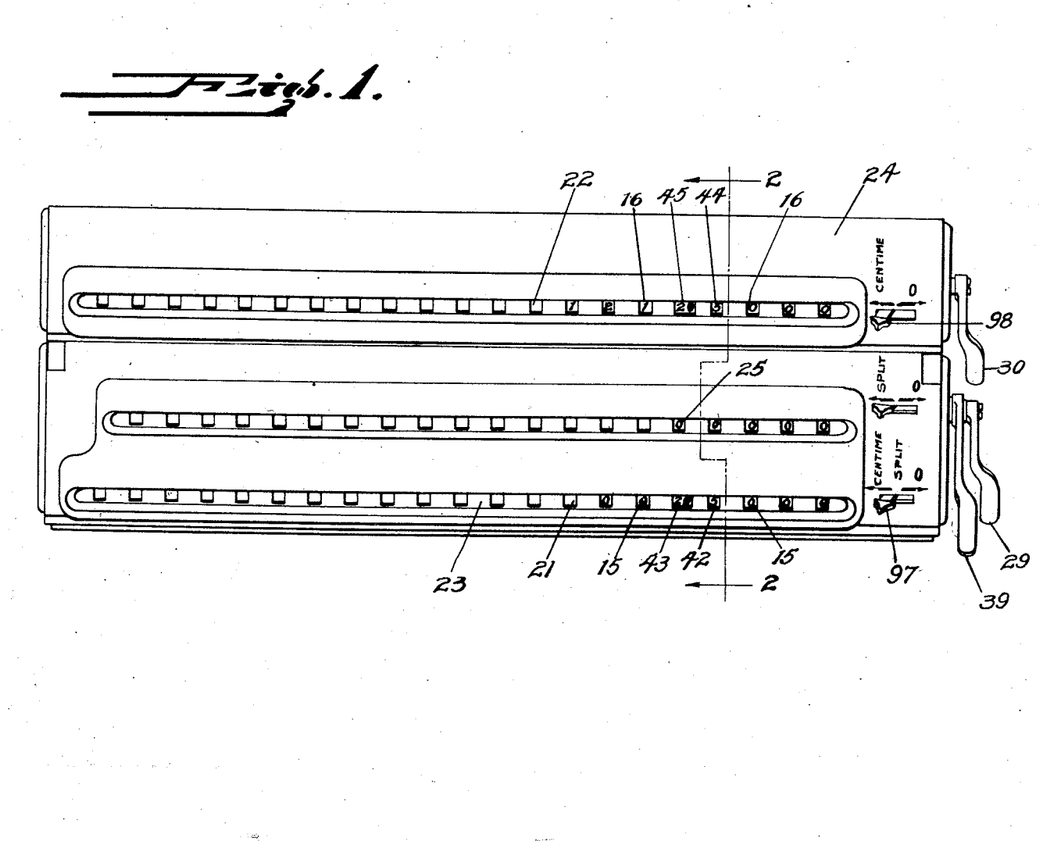
Figure 1 is a plan view of the register carriage of a calculating machine embodying the invention.
Figure 2:
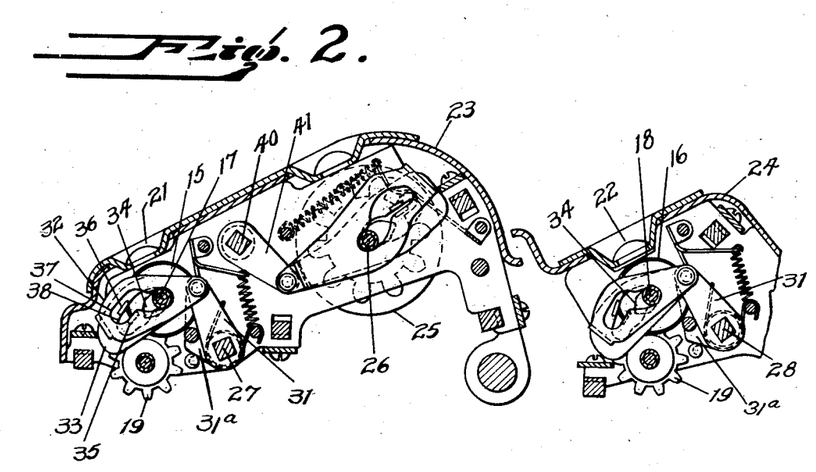
Figure 2 is a section, taken on line 2—2 of Figure 1.
Figure 3:
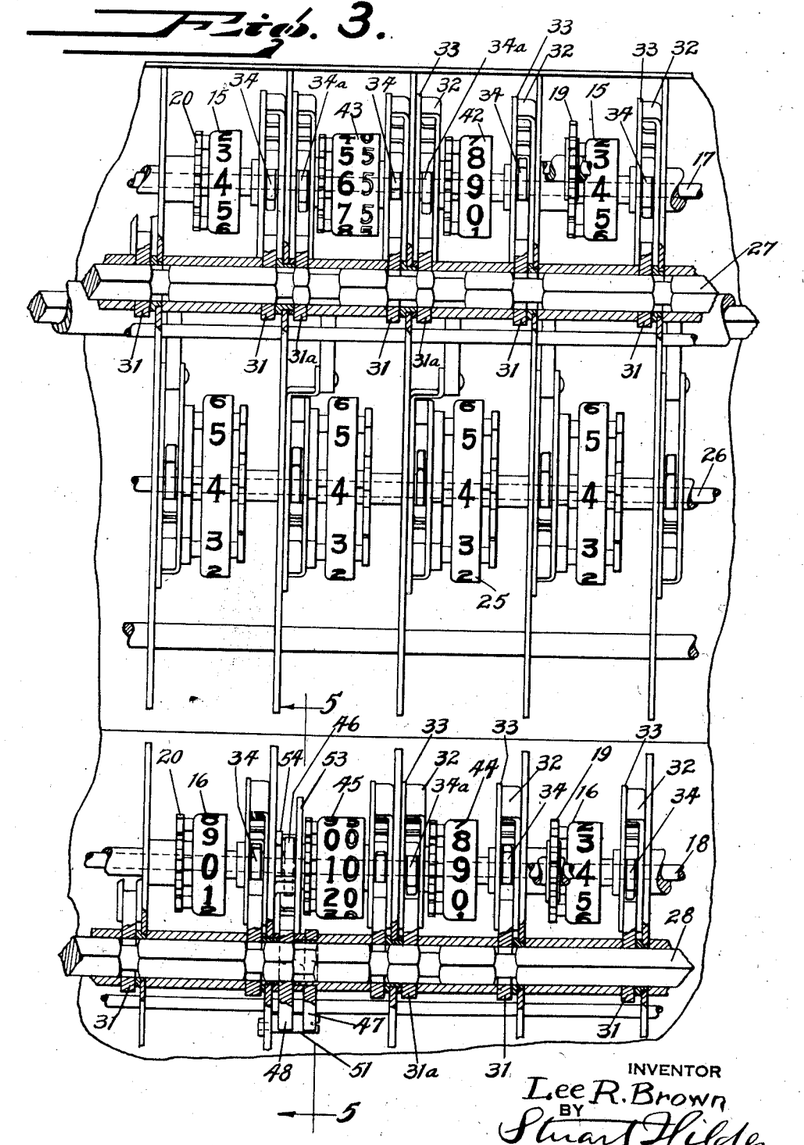
Figure 3 is a fragmentary bottom plan view of the carriage showing the special numeral wheels.

In resetting the register, shafts 27 and 28 are rocked clockwise as viewed in Figure 2, by means of the resetting levers 29 and 30, connected to said shafts by suitable lever and linkage means.

A lever 31 mounted on shaft 27 is associated with each wheel 15, and carries two pivoted plates 32 and 33, which plates are moved rearwardly by the rocking of shaft 27. A projection 34 secured to the hub of each wheel 15 lies in the path of lugs 35 or 36 of cam plates 32 and 33, so that the rearward movement of these plates, guided by engagement of cam surfaces 37 and 38 upon the hub of the wheel, will cause lug 35 or 36 to contact with projection 34 and rotate wheel 15 to zero registering position.

Numeral wheels 16 are reset in a similar manner upon rocking of shaft 28, and the revolution counting wheels 25 are cleared by operation of lever 39, connected to resetting shaft 40, provided with levers 41.

In calculating in centimes it has been stated that it is desirable to add 0.25 to the value appearing in the individual product register, but it is to be understood that, mechanically, this additional amount is not obtained by addition but is set into the wheels by resetting the centimes and ½ centimes wheels to 2 and to 5, respectively, before beginning the calculation of each product, the remaining wheels of this register being reset to zero.

Figures 4, 8:
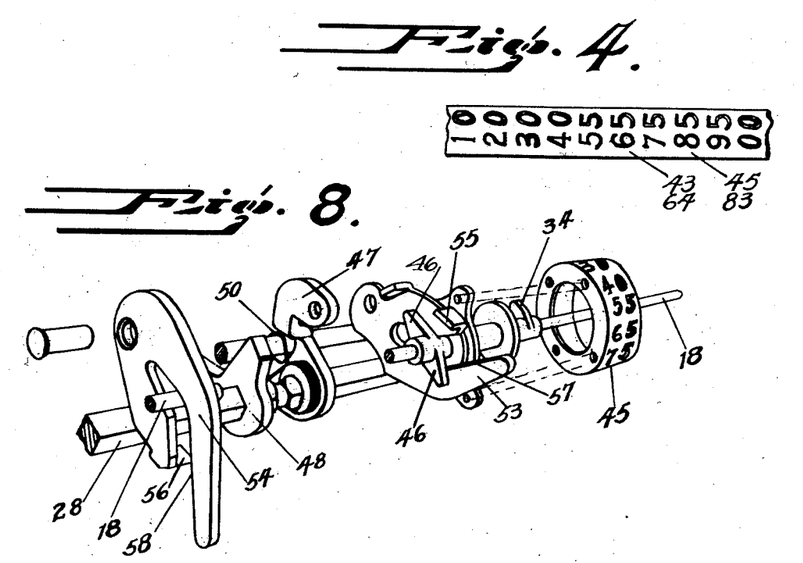
Figure 4 is a development of the peripheral face of a centimes wheel.
Figure 8 is an exploded perspective view of the centimes resetting members.

For this purpose projection 34—A on the hub of ½ centimes wheel 42 is so arranged in relation to the numerals displayed on said wheel as to cause said wheel to be reset to 5 when lever 29 is operated, an additional lever 31—A being provided to cooperate with projection 34—A. Similarly, the centimes wheel 43 of this individual product register is arranged to reset to 2 instead of 0. Preferably the centimes wheel is provided with two parallel series of figures upon its periphery (Figure 4), one series consisting of the digits 1 to 9 and 0 and the other series consisting of the characters 0 and 5 each repeated five times. The latter series is used in reading to the nearest five centimes and if desired a sliding shutter may be provided whereby one or the other series of figures may be displayed at the opening 21, according to the nature of the calculation being performed. For the same purpose, wheels 42 and 43 are preferably provided with projections 34, levers 31, etc. for clearing these wheels to zero in ordinary calculations. Levers 31 and 31—A are alternatively coupled to shaft 27, by endwise movement of said shaft, as controlled by setting lever 97.

As previously explained, in accumulating a series of products involving centimes calculations, the centimes and ½ centimes wheels of the grand total register should be reset each time the individual product register is reset, this serving not only to add the amount .025 to the registration but also to bring the tens transfer pin of the centimes wheel into proper position, by bringing the zero character corresponding to a true registration of 2, or a five character corresponding to a true registration of 7 to the sight opening 21. Thus, the wheel will register 0 or 5, but will transfer one to the wheel of next higher order upon an advance of eight or of three steps of rotary movement, respectively.

In this resetting of the grand total register, the accumulated registration on the wheels 16 to the left of the centimes wheel 45 is left undisturbed, while the wheels 16 to the right of the ½ centimes wheel 44 are reset to zero. The ½ centimes wheel 44 is reset in the same manner as the ½ centimes wheel 42 of the individual product register.

Figures 5, 6, 7:
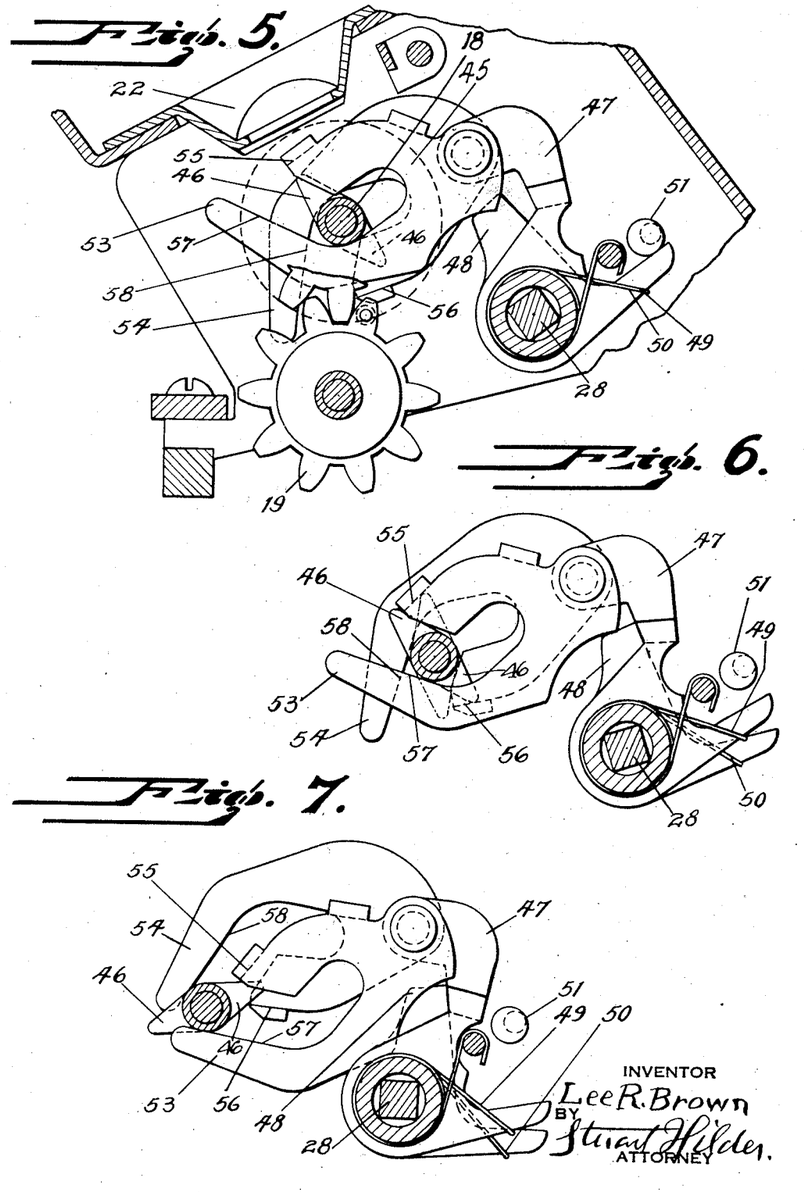
Figure 5 is a section, taken on line 5—5 of Figure 3 showing the resetting members associated with the centimes wheel, the parts being shown in normal position.
Figure 6 is a similar view, with the parts shown in an intermediate position taken during a resetting operation.
Figure 7 is a similar view with the resetting members shown in full stroke position.
Figure 9:
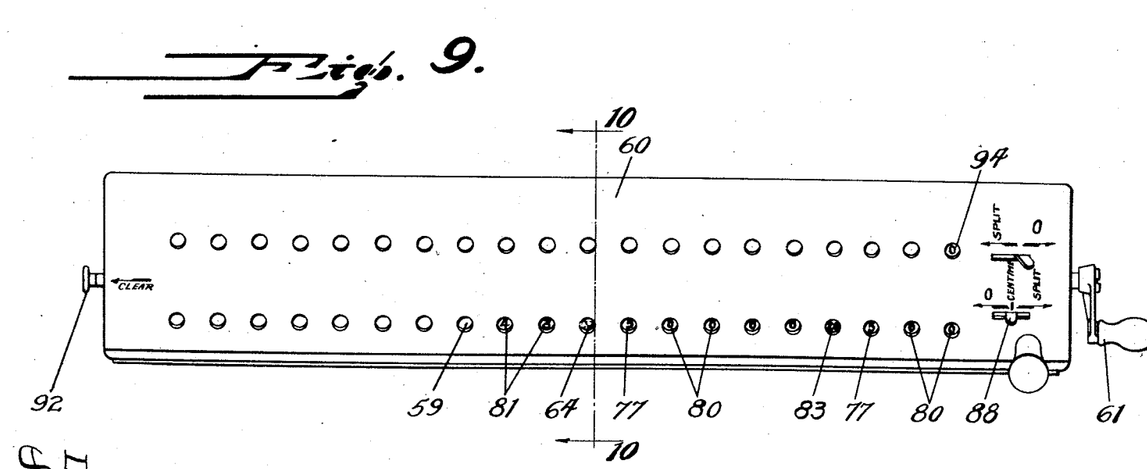
Figure 9 is a plan view of a register carriage to which a modified form of the invention is applied.
Figure 10:
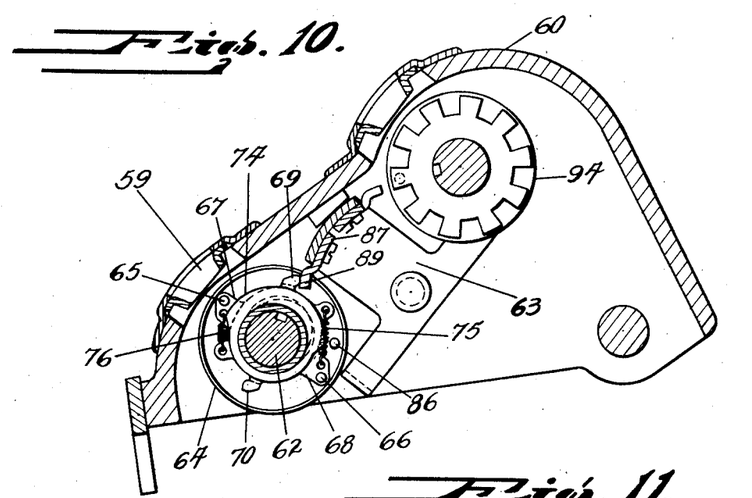
Figure 10 is a section, taken on line 10—10 of Figure 9.
Figures 11, 12, 13:
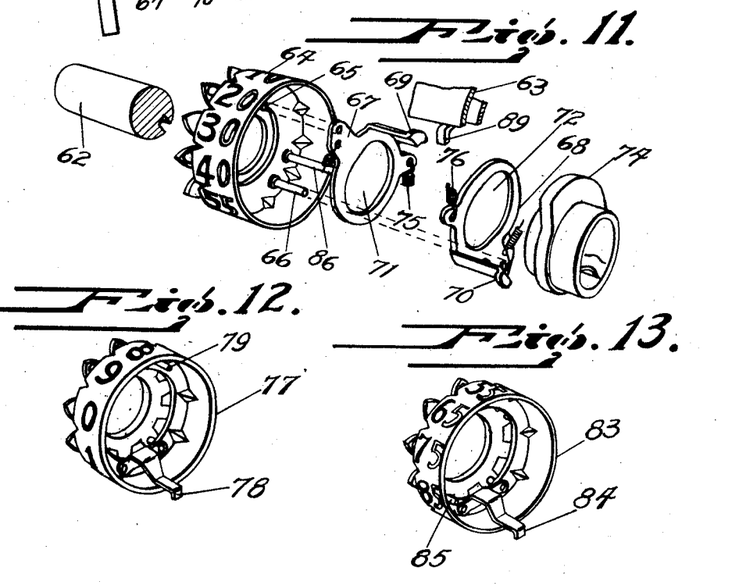
Figure 11 is an exploded perspective view of the centimes resetting members used in the second form of the invention.
Figure 12 is a perspective view of a ½ centimes wheel.
Figure 13 is a perspective view of a centimes wheel of the individual product register.
Figure 14:
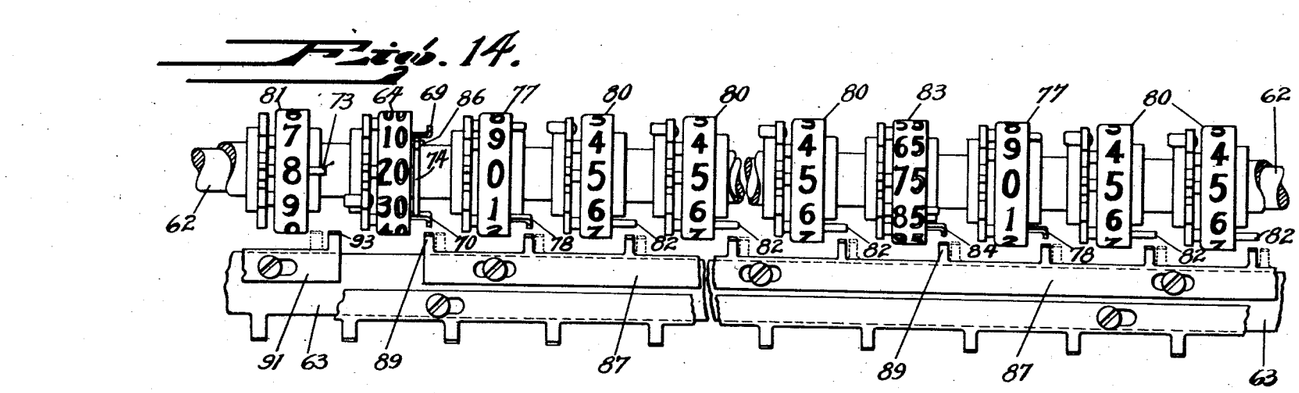
Figure 14 is a bottom plan view of a portion of the individual product and grand total registers of the second form of the invention, the resetting devices being adjusted for centime calculation.
Figure 15:
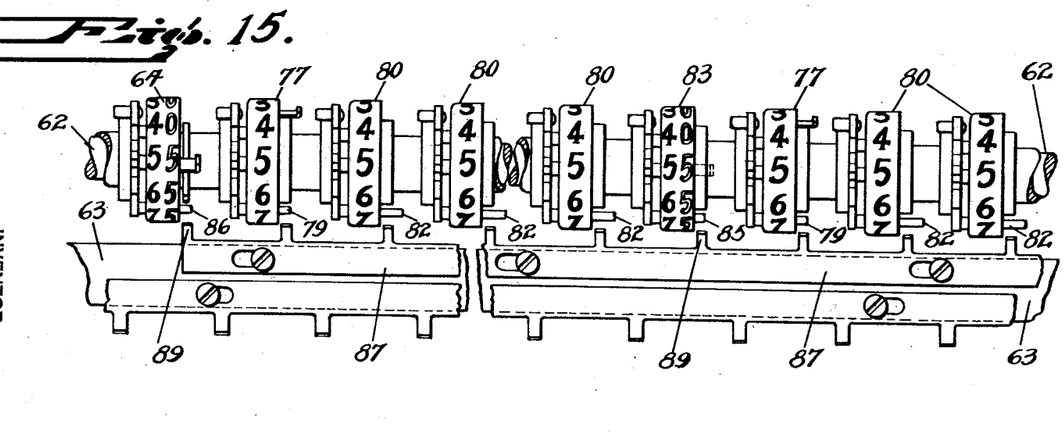
Figure 15 is a similar view showing the resetting members in position for setting the register to zero.

The centimes wheel 45, which is marked with two series of figures, similar to those upon wheel 43 is provided with two opposite projections 46, 46, (Figs. 5, 6, 7). Since the degree of movement given to wheel 45 in resetting is only half that given to the wheels 16, a lost motion connection is arranged between the shaft 28 and the centimes resetting lever 47. For this purpose, lever 47 is mounted loosely upon the shaft, and is adapted to be contacted by lever 48, clutched to the shaft. Levers 47 and 48 are held in normal position against stop 51 by springs 49 and 50. Cam plates 53 and 54 are pivoted upon lever 47 and the lugs 55, 56 of these plates normally lie diametrically opposite to each other, out of the path of movement of projections 46. Upon movement of arm 47 guide cams 57 and 58 will move lugs 55 and 56 toward shaft 18, bringing them into the path of movement of projections 46, and thereafter moving them rearwardly into contact with whichever projection 46 lies in their path of movement, to bring such projection into the position shown in Figure 7. In Figure 6, the full line position of the projections 46 illustrates a condition in which the lower of these projections will be carried rearwardly by lug 56, while the dotted line position illustrates the next adjacent registering position, in which the upper projection 46 will be carried rearwardly by lug 55.

The grand total register is adapted to be reset to zero in an endwise shifted position of shaft 28, controlled by setting lever 98, and it may be noted that this register should be brought to zero before the centimes and ½ centimes wheels are set to 2 and 5 in beginning the accumulation of a grand total.

Figures 9 to 15 illustrate the invention as applied to resetting means of a different type, and the individual products are accumulated in the right hand numeral wheels of a register 80, 81, and the grand totals are accumulated in the left hand numeral wheels thereof, by means of duplicate multiplicand setting at the right and left hand sides of the usual keyboard. The registrations are read through openings 59 in casing 60. Revolution counting wheels 94 are also provided.

The numeral wheels are reset by rotating a crank 61, whereby shaft 62 upon which the wheels are frictionally mounted, is rotated. Movement of crank 61 also rocks a bail 63 (Figure 10), provided with slides 87 and 91 having stop lugs 89 and 93, so that said lugs are brought into the path of movement of projections 82 and 73 of the numeral wheels.

Wheels 77 and 83 are provided with two sets of projections, 78, 79 and 84, 85 so that they may be reset to zero or reset to the required values in centime calculation, according to the lateral adjustment of slide 87, as governed by setting lever 88. Lever 88 and knob 92 may also be separately set to avoid clearing of the wheels 80 and 81 by the lugs of slides 87 and 91.

In order to set the centimes wheel 64 of the grand total register selectively to a registration corresponding to 2 or to 7, the following means are provided:

Two pivot studs 65 and 66 (Figures 10 and 11) are fast upon the inner flange of wheel 64, these studs supporting plates 67 and 68, provided with projections 69 and 70, these plates, in rocking about their pivots 65 and 66 bringing the projections into or out of position to contact with lug 89. A cam 74 is fast upon shaft 62, and is so designed that it will hold one of the projections 69 or 70 in active position, and the diametrically opposite projection in inactive position in any registering position of the numeral wheel. Therefore, as wheel 64 is rotated in accumulating an amount (shaft 62 remaining stationary) the projections 69 and 70 will be set in accordance with the registration on the wheel, and as shaft 62 is rotated in the resetting operation, carrying wheel 64 therewith, only one of the projections will be in position to contact with lug 89. Plates 67 and 68 are guided by the walls of elongated openings 71 and 72, embracing shaft 62, and the plates are connected with each other by springs 75 and 76, serving to retract the projections 69 and 70, as permitted by the cam.

The following series of problems will illustrate the dial readings, including both series of figures (actual registration and displayed value) of wheels 43 and 45:

|  | Actual products registration | Displayed product value | Actual grand total | Displayed grand total |
|---|---|---|---|---|
| 5.51×.73=4.0223 | 4.0473 | 4.00 | 4.0473 | 4.00 |
| 5.53×.73=4.0369 | 4.0619 | 4.05 | 8.0649 | 8.05 |
| 5.57×.73=4.0661 | 4.0911 | 4.05 | 12.1369 | 12.10 |
| 5.59×.73=4.0807 | 4.1057 | 4.10 | 16.2057 | 16.20 |
| 16.2060 | | | | |

I claim:

1. In a register having a numeral wheel; means for resetting said wheel to the nearest one of two predetermined angular positions, including a device upon said wheel comprising two projections, a projection engaging device, means for moving one of said devices relatively to the other, and means including a member having a cam surface controlling one of said devices and operable to engage the second named device with the projection nearest adjacent a given angular position.

2. In a register having a numeral wheel; means for resetting said wheel to the nearest one of two predetermined angular positions, including two projections upon said wheel, a projection engaging device operable to rotate the wheel forwardly or reversely, means for guiding said engaging device into contact with the projection nearest adjacent a given angular position.

3. In a register having a numeral wheel; means for resetting said wheel to the nearest one of two predetermined angular positions, including two diametrically opposite projections upon said wheel, a projection engaging device comprising a reciprocatory member, two arms pivoted upon said member, and means for guiding the free ends of said arms oppositely about the axis of said wheel, each through an arc of approximately ninety degrees.

4. In a register having a shaft and a numeral wheel frictionally mounted thereon; means for resetting said wheel to the nearest one of two predetermined angular positions, including two projections upon said wheel, a settable projection engaging member, means for rotating the shaft, and means for adjusting said projections into and out of a path intersecting the position of the set engaging member.

5. In a register having a shaft and a numeral wheel frictionally mounted thereon; means for resetting said wheel to the nearest one of two predetermined angular positions, including two projections upon said wheel, a settable projection engaging member, means for rotating the shaft, and a cam upon said shaft, operable in the movement of the wheel relative to the shaft to adjust one of said projections out of a path intersecting the position of the set engaging member.

Signed at Orange in the county of Essex and State of New Jersey this 20 day of July A. D. 1931.

LEE R. BROWN.